United States Patent [19]

Huller et al.

[11] 4,173,610

[45] Nov. 6, 1979

[54] PROCESS FOR THE MANUFACTURE OF LUMP CALCIUM SULFATE

[75] Inventors: Rolf Huller, Iphofen; Alfons Knauf, Siersburg; Franz Wirsching, Iphofen, all of Fed. Rep. of Germany

[73] Assignee: Gebr. Knauf Westdeutsche Gipswerke, Fed. Rep. of Germany

[21] Appl. No.: 862,605

[22] Filed: Dec. 20, 1977

[30] Foreign Application Priority Data

Dec. 24, 1976 [DE] Fed. Rep. of Germany ....... 2658915

[51] Int. Cl.² .............................................. B01J 2/22
[52] U.S. Cl. ..................... 264/28; 264/109; 264/117
[58] Field of Search .......................... 264/117, 109, 28

[56] References Cited

U.S. PATENT DOCUMENTS

| | | | |
|---|---|---|---|
| 3,231,649 | 1/1966 | Pfeiffer | 264/109 |
| 3,414,643 | 12/1968 | Collie | 264/109 |
| 3,789,097 | 1/1974 | Beck et al. | 264/117 |

*Primary Examiner*—Robert F. White
*Assistant Examiner*—James R. Hall
*Attorney, Agent, or Firm*—Millen & White

[57] ABSTRACT

Pelletized calcium sulfate is prepared from finely divided, natural or synthetic calcium sulfate, wherein the particle size of the finely divided calcium sulfate is at least about 90 per cent by weight less than 200 μm, there being no particles larger than 500 μm, and wherein the finely divided calcium sulfate has a free water content of from about 0.5 to about 4 per cent by weight, by pressing the finely divided calcium sulfate in the presence of water with a roll press using a surface pressure of 1 to 5 Mp per cm roller length.

4 Claims, No Drawings

PROCESS FOR THE MANUFACTURE OF LUMP CALCIUM SULFATE

Finely divided calcium sulfate such as that which is produced as an abrasive dust or as filter dust, for example, during the crushing of natural gypsum or natural anhydrides, can not be used in its finely divided state in the construction industry. Similarly, finely divided calcium sulfate which is formed as a byproduct of various chemical processes can not be used. Examples of chemical processes yielding such finely divided products include (a) the generation of phosphoric acid by the conversion of raw phosphate by means of sulfuric acid, (b) the generation of hydrofluoric acid by means of sulfuric acid acting on flourite, and (c) the removal of sulfur from flue gases. These finely divided calcium sulfate materials generally can not be measured by conventional measuring devices and then processed further. Furthermore, the handling of such finely divided calcium sulfate is coupled with considerable dust nuisance problems.

For these reasons, pelletization processes have been developed to convert such finely divided calcium sulfate materials into lump products. In these processes, however, it is necessary to dry the finely divided calcium sulfate, either wholly or partially, so as to dehydrate the same or to mix the finely divided calcium sulfate with a calcium sulfate having a higher setting quality, such as calcium sulfate-semi hydrate, either before or during the pelletization operation. Only by following the above procedures has it been possible to manufacture pellets from such finely divided calcium sulfate which will possess, after rehydration, the strength characteristics required for commercial use. In this latter regard, it may be advantageous to add one or more agents to the finely divided calcium sulfate so as to stimulate the rehydration of the pellets formed therewith. Processes employing such agents are described, for example, in German AS No. 1,168,355 or in U.S. Pat. No. 2,412,170.

In addition, processes are known in which calcium sulfates are transformed into lump form by means of the addition of binding agents such as carboximethyl-cellulose, or in the presence of crystal modifying substances. These processes are depicted, for example, in German OS Nos. 2,504,954 or 1,927,015, respectively.

Since these processes for the generation of lump products from finely divided calcium sulfate by way of pelletization involve several work phases and are therefore technically expensive, a way has been sought to transform these finely divided calcium sulfates into a coarse lump product with a particle size and a mechanical strength sufficient for most applications, and to accomplish this by way of a single operation.

Such a process for the manufacture of lump calcium sulfate from finely divided calcium sulfate has now been found. By this process, the finely divided calcium sulfate is adjusted to a free water content of from more than zero, for example, about 0.5 weight percent to about 4 weight percent and is subsequently pressed by a roll press using a contact pressure of from about 1 to about 5 metric tons per cm (hereinafter Mp per cm) of roller length.

By means of this invention, it is possible to convert fine dust which is encountered in the mechanical treatment of natural calcium sulfates and the semihydrates that are thus obtained into lump form. Similarly, synthetic finely divided calcium sulfates which are obtained in the chemical industry as byproducts, or in the course of desulfurization of flue gases, can be converted into lump form by means of the process defined by this invention. These calcium sulfates can be used as natural or synthetic dihydrates or as synthetic semihydrates as well as natural or synthetic anhydrates. It is also possible to process by this invention the α-calcium sulfate-semihydrates such as encountered, for example, in the generation of phosphoric acid using the wet process of the dehydration of calcium sulfate-dihydrates obtained in autoclaves. Prior to compacting, it might be advantageous to stabilize these α-calcium sulfate-semihydrates. Subsequently, it is advantageous that the α-calcium sulfate-semihydrates which appear in the shape of briquettes or shells be rehydrated to a dihydrate. This is done by dipping the briquettes into water or by spraying them with water. These briquetted raw materials can be especially attractive for further use if they are comprised of at least about 90 weight percent of particles smaller than 200 μm and no particles greater than 500 μm. Furthermore, it is especially advantageous to use such calcium sulfate briquettes when they have a degree of purity of at least 80 percent by weight.

The finely divided base material used to form the briquettes must at first be brought to a free water content of from slightly larger than zero, for example, about 0.5 percent by weight up to about 4 percent by weight. The amount of free water contained in the raw material can be adjusted by mixing suitable amounts of wet raw material with dry raw material. Wet raw material can, without difficulty, be dried to a free water content of from about 0.5 up to about 4 weight percent. Conventional driers, such as, for example, electric current driers, contact driers, turbine driers, rapid driers, etc. can be used.

The finely divided calcium sulfate that has been treated in this fashion and whose content on free water has been adjusted to a value between about 0.5 and 4 weight percent, is led then to a roll press and there transformed into a pellet or lump shape at temperatures between about zero and about 60° C. and contact pressures of from about 1 to 5 Mp per cm roller length. For this purpose, so-called briquetting rollers can be used into whose convex surface, briquette-shaped depressions are cut. When using briquetting rollers, it is advantageous to use raw material which has a free water content that is near the upper limit of the range, i.e., about 4 percent. Otherwise, during the briquetting operation, the reduced glide effect caused by the reduced free water content of the raw material must be compensated for by higher specific contact pressures. This, however, can produce a splitting of the briquettes, and the resulting briquette halves can clog the roller molds so that they can be removed only with greater difficulty. When compacting the raw material with smooth or profiled rollers, this problem is not encountered so that raw material with a free water content nearer the lower limit of the range can be used. In this manner, so-called barnacles or shells are formed which can be subsequently broken up after leaving the roll press. That is done if especially uniform particle size is desired for the compacted product. In some cases, it may be desirable to remove the sharp edges of the shells since they are susceptible to breakage. For this purpose, the shells are ground in a rotating drum by means of the rotary movement.

When the free water content is below the given limit, then the adhesion between the individual particles of the finely divided raw material that can be obtained by pressure in the roller press is too low to permit a significant particle size enlargement. On the other hand, when the free water content of the raw material exceeds the 4 weight percent upper limit, water is pressed from the finely divided compacted mass during the roller press operation. This reduces the strength of the briquettes or shells that are thus obtained so that on emerging from the roll press or upon some other minute mechanical action, they will suffer excessive breakage.

The briquettes or shells which are generated by the present invention from finely divided raw material with more than about 0.5 and up to about 4 percent by weight free water, without binding agents or other additives, possess sufficient strength for nearly all requirements encountered in the construction industry. This is accomplished without reducing in any way the other valuable characteristics of calcium sulfate, for example, the setting characteristics or the strength characteristics. Furthermore, the briquettes or shells made according to the present invention possess a very lower wear characteristic so that they can be handled without encountering large quantities of dust. The briquettes or shells that are removed from the roll press increase their own strength during the subsequent storage phase. A still further increase in the strength characteristic and a reduction of the wear characteristic is obtained in the subsequent drying of the briquettes or shells.

The invention will be understood more fully in view of the following examples:

EXAMPLE 1

Cleaned, finely divided, stabilized α-calcium sulfate-semihydrate, such as is obtained during the generation of phosphoric acid from raw phosphate and sulfuric acid in the so-called semihydrate process, has a particle distribution as follows: 24 weight percent smaller than 63 $\mu$m, 0.3 weight percent larger than 200 $\mu$m and 0 percent larger than 500 $\mu$m. The free water content of the raw or base material is dried so as to reduce the original 18.1 weight percent water to a free water content of 1.6 weight percent. This is done with an electric current drier with a re-mix capability. This raw material is then pressed into briquettes with a mean grain diameter of 25 mm by a briquetting roll press at ambient temperature and with a contact pressure of 2.75 Mp per cm roller length without breaking the briquette shape. The green point strength of the briquette (measured immediately upon emerging from the roll press) is between 19 and 21 kp at a wear characteristic of a maximum of 5 weight percent having a grain size of less than 1 mm. These semihydrated briquettes can be converted into dihydrate briquettes with still higher strength and still lower wear characteristics after they have been destabilized and sprayed with 15 weight percent of water.

EXAMPLE 2

Cleaned, finely divided calcium-sulfate-dihydrate, such as is obtained during the generation of phosphoric acid in the Wet Process, has a particle size distribution as follows: 55.8 weight percent smaller than 63 $\mu$m, 0.7 weight percent larger than 200 $\mu$m and 0 percent larger than 500 $\mu$m. The free water content of 20.2 weight percent of this base material is reduced to 2.2 weight percent by adding and mixing 8.2 weight percent dry calcium sulfate-dihydrate per share weight of raw material. This material is pressed at ambient temperature in a briquetting roll press using a specific contact pressure of 2.75Mp per cm roller length to form briquettes with a mean grain diameter of 25 mm. The green point strength characteristic of the obtained briquettes is 12–15 kp at a wear characteristic of 7 weight percent having a grain size of below 1 mm.

EXAMPLE 3

Cleaned, finely divided calcium sulfate-dihydrate, such as is obtained during the desulferization of flue gases, possesses free water content of 10 weight percent and has the following particle size distribution: 53.6 weight percent smaller than 63 $\mu$m, 1.5 weight percent larger than 200 $\mu$m and 0 percent larger than 500 $\mu$m. By adding and mixing 2.5 weight percent of dry calcium sulfate-dihydrate per weight share of wet calcium sulfate-dihydrate, a mass having a free water content of 2.9 weight percent is obtained. This mass is pressed at ambient temperature in a briquetting roll press at a specific contact pressure of 2.65 Mp per cm roller length to form briquettes having a mean grain diameter of 43 mm. The green point strength characteristic of the briquettes that are obtained rests between 9–10 kp at a wear characteristic of 8 weight percent having a grain size of below 1 mm.

EXAMPLE 4

The calcium sulfate-dihydrate specified in Example 2 is mixed with 17.4 parts by weight of dry calcium sulfate-dihydrate to yield a mass having a free water content of 1.1 weight percentage. This mass is fed into a compacting roll press at ambient temperature and is pressed with a contact pressure of 3.3 Mp per $\mu$m roller length to shells or briquettes. The green point strength characteristic of these shells amounts to from 11 to 13 kp at a wear of 8 weight percent having a grain size of below 1 mm.

EXAMPLE 5

Very fine dust material is collected from a natural gypsum plant. The dust material has a free water content of 0.6 weight percent and has a particle size distribution such that 95.6 weight percent is smaller than 63 $\mu$m and 0 weight percent is greater than 200 $\mu$m. This material is pressed in a briquetting press at ambient temperature and at a specific contact pressure of 2.75 Mp per cm roller length to form briquettes having a mean grain size diameter of 25 mm. The greenpoint strength characteristic of the briquettes that are thus obtained amounts to 10–14 kp at a wear characteristic of 10 weight percent having a grain size of less than 1 mm.

The invention being thus described, it will be apparent that modifications may be made without departing from the spirit and scope thereof, as set forth in the following claims.

We claim:

1. A process for the manufacture of calcium sulfate pellets from finely divided natural or synthetic calcium sulfate, which comprises:
    adjusting the free water content of the finely divided calcium sulfate to a value of from about 0.5 to about 4 percent by weight; and
    pressing the resultant finely divided calcium sulfate by means of a roll press using a surface pressure of from about 1 to about 5 Mp per cm of roller length,
    said pressing step being performed at a temperature between about 0° and about 60° C.

2. The process of claim 1, wherein the finely divided calcium sulfate contains at least about 90 weight percent of particles smaller than 200 μm and has no particles larger than 500 μm.

3. The process of claim 1, wherein the finely divided calcium sulfate has a degree of purity of at least about 80 percent by weight.

4. The process of claim 2, wherein the finely divided calcium sulfate has a degree of purity of at least about 80 percent by weight.

* * * * *